Patented Dec. 28, 1937

2,103,240

UNITED STATES PATENT OFFICE 2,103,240

NONSPECIFIC SPERMATOXIC VACCINE AND PROCESS OF PRODUCING SAME

Morris J. Baskin, Denver, Colo.

No Drawing. Application July 6, 1935, Serial No. 30,162

12 Claims. (Cl. 167—78)

This invention relates to sperm and seminal determinants, spermatoxic vaccines and the like and particularly to such a product which is non-specific and to a process of producing the same.

An object of the invention is the provision of a testicular product adapted for use non-specifically as a sperm and seminal determinant and spermatoxic vaccine.

A further object is the provision of a process of producing such a product and especially the rendering of the same non-specific.

More particularly, an object of the invention is the production, from materials obtained from the lower animals, of a determinant for human sperm and semen and usuable as a vaccine or antigen in vaccination of human female to produce spermatoxic condition in her blood and secretions. Other uses of the product will be apparent to the medical profession and others skilled in the art.

Spermatoxic vaccines effective only upon the species from which obtained, have been produced and used. Such vaccines are practically limited to laboratory or experimental use and because of the natural and obvious limitations upon the supply of material the production of such vaccines from humans for use upon humans is impractical. For the same reason production, from human sources, of substances to be used for determining presence of sperm or semen, is likewise impractical.

The present invention provides for the extraction of the testicular spermatozoa from fresh mammalian testicular structures, subjecting the same to a process which, while preserving the spermatozoa and rendering it practically free from injurious substances, results in a product which may be used in the process of ascertaining the presence of human sperm or semen and also, when applied to the human female by vaccination, produces in her a condition of immunization to the human sperm, and without injurious results.

In practicing this invention I proceed as follows: From the testicular structure of mature mammals, the tunica and connective tissue is removed by dissection. The testicles are then mascerated. A meat grinder may be used for this purpose.

To the mascerated material there is added preferably about one-half by volume of liquid, preferably an isotonic solution such as Ringer's or salt solution. The mixture is then finely ground, as in a mortar with sea sand, until it is smooth and homogeneous after which it is heated to within the range of fifty to one hundred degrees centigrade.

The mixture is then centrifuged and the supernatent fluid retained, discarding the sediment. To the retained fluid there is added an antiseptic such, for example, as sodium ethyl mercurithiosalicylate (merthiolate) to make a solution approximately one-five-thousandth (1/5000). Then a preservative, such as chloretone or phenol, is added to make an approximately five-tenths per cent (.5%) solution.

The solution thus produced will test or assay as follows, viz, inject 1 c. c. into female rats at weekly intervals for three doses. One week after last dose withdraw blood from the heart of rat. A precipitant test will be positive for spermatozoa.

The solution thus produced and tested will be useful in the process of ascertaining the presence of human sperm and semen and safe for vaccination of women and effective in producing a spermatoxic condition, useful where undesired conception may endanger health and for other purposes obvious to the medical profession and others skilled in the art.

The heating of the mixture, as above described, is essential to the rendering of the product non-specific.

The isotonic solution is preferable to water or other non-isotonic solution because it is more efficient in the extraction of the desired material from the testicular matter and because it reduces the pain or discomfort attendant upon the vaccination.

The addition of antiseptic is not essential to the effectiveness of the product but is necessary for safety in case of the use of the product on human beings.

The preservative is not essential to the effectiveness of the product but should be added when the product is not to be used promptly after production.

In use of the product as a determinant it will usually be injected into some animal by vaccination. The blood of the animal will then be used in a solution of or containing the matter to be tested. Precipitation from this solution indicates the presence of sperm or semen in the tested matter. When using the preparation as a vaccine it is injected intra-muscularly, preferably in the buttocks, the dose or treatment for the average person being four injections five to seven days apart using 2 ccs. for the first injection, 8 ccs. for the second and 10 ccs. each for the third and fourth injections. Number of injections increased in case of larger persons.

Variations of detail in the steps of the process and in the structure of the product, within the spirit and scope of the foregoing specification and appended claims will occur to those skilled in the art and I do not wish to be limited to the details of the herein described process and/or product.

I claim:

1. A spermatoxic vaccine containing mammalian spermatozoa rendered non-specific by heat.

2. A spermatoxic vaccine containing mammalian spermatozoa which has been rendered non-specific by heating to between 50 and 100 degrees C.

3. A spermatoxic vaccine containing a mixture of mammalian spermatozoa and a liquid harmless to humans when sub-cutaneously injected, the spermatozoa having been rendered non-specific by heat.

4. A spermatoxic vaccine containing a mixture of mammalian spermatozoa and an isotonic solution, the spermatozoa having been rendered non-specific by heating to between 50 and 100 degrees C.

5. A spermatoxic vaccine containing a liquid harmless to humans when sub-cutaneously injected and mammalian spermatozoa rendered non-specific by heat, and an antiseptic harmless to humans when sub-cutaneously injected.

6. The process of producing spermatoxic vaccine comprising obtaining the spermatozoa from mammalian testicles, adding a liquid harmless to humans when sub-cutaneously injected, rendering the mixture homogeneous, heating the mixture to render the spermatozoa non-specific.

7. The process of producing spermatoxic vaccine comprising obtaining the spermatozoa from mammalian testicles, adding approximately one-half by volume of liquid harmless to humans when sub-cutaneously injected, rendering the mixture homogeneous, heating the mixture to render the spermatozoa non-specific.

8. The process of producing spermatoxic vaccine comprising obtaining the spermatozoa from mammalian testicles, adding a liquid harmless to humans when sub-cutaneously injected, rendering the mixture homogeneous, heating the mixture to between 50 and 100 degrees C.

9. The process of producing spermatoxic vaccine comprising obtaining the spermatozoa from mammalian testicles, adding an isotonic solution thereto, rendering the mixture homogeneous, heating the mixture to between 50 and 100 degrees C.

10. A spermatoxic vaccine containing a mixture of mammalian spermatozoa and an isotonic solution, the spermatozoa having been rendered non-specific by heat.

11. The process of producing a spermatoxic vaccine comprising obtaining mammalian spermatozoa and heating the same to render the spermatozoa non-specific.

12. The process of producing a spermatoxic vaccine comprising obtaining mammalian spermatozoa and heating the same to between 50 and 100 degrees C.

MORRIS J. BASKIN.